United States Patent Office 3,248,434
Patented Apr. 26, 1966

3,248,434
HALOVINYL SUBSTITUTED CYCLODODECATRI-
ENES AND A METHOD FOR THE PREPARATION
THEREOF
Louis Schmerling, Riverside, Ill., assignor to Universal
Oil Products Company, Des Plaines, Ill., a corporation
of Delaware
No Drawing. Filed Feb. 13, 1963, Ser. No. 258,165
16 Claims. (Cl. 260—648)

This invention relates to novel compositions of matter comprising halovinyl substituted cyclic trienes and to a method for the preparation thereof. More particularly the invention is concerned with new compositions of matter comprising halovinyl substituted non-conjugated cyclic trienes.

It has now been discovered that a novel composition of matter may be prepared by a reaction which consists of the condensation of a haloolefin with a cyclic triene in the presence of certain catalytic compositions of matter. The products thus prepared which may be characterized generically as being halovinyl substituted cyclic trienes will find a wide variety of uses in the chemical field such as intermediates for the preparation of aldehydes, acids and other types of compounds which may be used in resins, pharmaceuticals, etc. In addition, it is also contemplated that compounds of the type prepared according to the process containing a sufficient number of chlorine atoms may be used as insecticides or as intermediates in the preparation of other compounds, the final product which is useful as an insecticide, especially against houseflies.

It is therefore an object of this invention to provide a process for the condensation of a haloolefin of a particular type hereinafter set forth in greater detail with a cyclic triene.

A further object of this invention is to prepare novel compositions of matter by condensing a haloolefin with a non-conjugated cyclic triene to prepare products useful as insecticides.

Taken in its broadest aspect one embodiment of this invention resides in a process which comprises condensing a haloolefin with a non-conjugated cyclic triene in the presence of a free radical generating compound at a temperature at least as high as the decomposition temperature of said compound, and recovering the desired halovinyl substituted non-conjugated cyclic triene.

Another embodiment of this invention is found in a process which comprises condensing a polyhaloolefin containing at least one chloro substituent on each of the doubly-bonded carbon atoms with a non-conjugated cyclododecatriene in the presence of di-t-butyl peroxide at a temperature in the range of from about 130° to about 280° C. and recovering the desired chlorovinyl substituted non-conjugated cyclododecatriene.

A further embodiment of this invention is found in a halovinyl substituted non-conjugated cyclic triene.

A specific embodiment of this invention resides in a process which comprises condensing trichloroethylene with 1,5,9-cyclododecatriene in the presence of di-t-butyl peroxide at a temperature in the range of from about 130° to about 150° C., and recovering the desired (2,2-dichlorovinyl) cyclododeca-1,5,9-triene.

Another specific embodiment of this invention is found in (2,2-dichloro-1-methylvinyl)cyclododeca-1,5,9-triene.

Other objects and embodiments referring to alternative haloolefins and alternative cyclic trienes will be found in the following further detailed description of this invention.

As hereinbefore set forth it has now been discovered that novel compositions of matter comprising halovinyl substituted non-conjugated cyclic trienes may be prepared by condensing a haloolefin with a cyclic triene in the presence of certain catalytic compositions of matter. Suitable cyclic trienes which may be used in the process of this invention are those which do not possess a conjugated configuration and include 1,4,7-cyclononatriene, 1,4,7-cyclodecatriene, 1,4,8-cyclodecatriene, 1,4,7-cycloundecatriene, 1,4,8-cycloundecatriene, 1,4,7-cyclododecatriene, 1,5,9-cyclododecatriene, etc. Of the hereinbefore set forth cycloalkatrienes, 1,5,9-cyclododecatriene which is a polymer of 1,3-butadiene is the preferred starting material due to its greater availability and relatively lesser cost. However, it is to be understood that the non-conjugated cyclic trienes are only representatives of the class of compounds which may be used and that the process of the present invention is not necessarily limited thereto.

The haloolefins which may be reacted with a non-conjugated cyclic triene in the presence of a free radical generating catalyst in accordance with the process of this invention comprise haloolefins containing a pair of doubly-bonded carbon atoms and at least one chlorine atom attached to each of the doubly-bonded carbon atoms. The term "haloolefin" as used in the specification and appended claims will refer to olefins containing more than one halogen atom and will include polyhalomonoolefinic compounds. As is readily observed in the type of configuration of the olefins hereinbefore set forth one valence of each of the doubly-bonded carbon atoms is left free, and these free valences may be taken up by other substituents such as hydrogen atoms, halogen atoms having an atomic weight of between 19 and 80 (fluorine, chlorine and bromine), an alkyl group such as methyl, ethyl, propyl, etc., and a haloalkyl group such as fluoromethyl group, chloromethyl group, bromomethyl group, dichloromethyl group, chloroethyl group, trifluoromethyl group, etc. A preferred species of these polyhaloolefins comprises compounds which may be generically termed "polychloroethylenes," in which each of the doubly-bonded carbon atoms has at least one chlorine atom attached thereto. Examples of suitable polychloroolefins include 1,2-dichloroethylene,
trichloroethylene,
1-fluoro-1,2-dichloroethylene,
1-bromo-1,2-dichloroethylene,
tetrachloroethylene,
1,2-difluoro-1,2-dichloroethylene,
1,2-dibromo-1,2-dichloroethylene,
1-fluoro-2-bromo-1,2-dichloroethylene,
1,2-dichloro-1-propene,
1,1,2-trichloro-1-propene,
1,1,3-trichloro-1-propene,
1,1,2,3-tetrachloro-1-propene,
1,2,3-trichloro-1-propene,
1,2,3,3-tetrachloro-1-propene,
1,2,3,3,3-pentachloro-1-propene,
1-fluoro-1,2-dichloro-1-propene,
3-fluoro-1,2-dichloro-1-propene,
1,3-difluoro-1,2-dichloro-1-propene,
1,3,3-trifluoro-1,2-dichloro-1-propene,
3,3,3-trifluoro-1,2-dichloro-1-propene,
3,3,-difluoro-1,2-dichloro-1-propene,
1-bromo-1,2-dichloro-1-propene,
3-bromo-1,2-dichloro-1-propene,
1,3-dibromo-1,2-dichloro-1-propene,
3,3-dibromo-1,2-dichloro-1-propene,
3,3,3-tribromo-1,2-dichloro-1-propene,
1,2-dichloro-1-butene,
2,3-dichloro-2-butene,
1,1,2-trichloro-1-butene,
1,2,3-trichloro-1-butene,
1,1,2,3-tetrachloro-1-butene,
1,2,3-trichloro-2-butene, 1,2,3,4-tetrachloro-1-butene,
1,2-dichloro-1-pentene,
2,3-dichloro-2-pentene,
1,2-dichloro-1-hexene,
2,3-dichloro-2-hexene,
3,4-dichloro-3-hexene,
1,2-dichloro-1-heptene,
1,2-dichloro-1-octene,
1,2-dichloro-1-nonene,
1,2-dichloro-1-decene, etc.

It is essential that the polychloroolefins contain at least two chlorine atoms per molecule since monochloroolefins do not give a condensation reaction of the type herein described. Similarly polyhaloolefins other than polychloroolefins containing at least one chlorine atom on each of the doubly-bonded carbon atoms do not give reactions of the type described herein. For example, 1,2-dibromoethylene as well as tribromoethylene are inoperative in the process of the present invention. As set forth hereinabove polychloroolefins such as 3,3,3-trifluoro-1,2-dichloro-1-propene that contain one or more fluorine atoms may be used in this process since the fluorine atoms in such compounds do not noticeably affect the activity of the chlorine atoms. Likewise, one or more fluorine atoms may be attached to the doubly-bonded carbon atoms provided that the above mentioned requirement for chlorine atoms attached to the doubly-bonded carbon atoms is met.

The catalysts that may be used in the process of the present invention are those which are capable of forming free radicals under the reaction conditions. These include diazonium compounds, metal alkyls, and peroxy compounds. Peroxy compounds contain the bivalent radical —O—O— which decomposes to form free radicals which initiate the general reaction of the present invention. Examples of such peroxy compounds are the persulfates, perborates and percarbonates, of the alkali metals and ammonium; peracetic acid, persuccinic acid, dimethyl peroxide, diethyl peroxide, di-t-butyl peroxide, dipropyl peroxide, acetyl peroxide, propionyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, 2,4-dichlorobenzoyl peroxide, methylethylketone peroxide, cyclohexanone peroxide, cumene hydroperoxide, diisopropylbenzene hydroperoxide, paramenthane hydroperoxide, isopropyl percarbonate, etc. The organic peroxy compounds constituted a preferred class of catalysts for use in this invention. Mixtures of peroxy compound catalysts may be employed or the peroxy compound catalysts may be utilized in admixture with various diluents for the process of this invention. Thus organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methylethylketone peroxide in dimethylphthalate, cyclohexanone peroxide with dibutyl phthalate, acetyl peroxide in dimethylphthalate, etc. Only catalytic amounts (less than stoichiometric amounts) need be used in the process.

The condensation of the polyhaloolefins and particularly polychloroolefins is illustrated by the following equation which was the condensation of one molecular proportion of 1,5,9-cyclododecatriene with one molecular proportion of trichloroethylene in the presence of an organic peroxide catalyst such as di-t-butyl peroxide with the corresponding evolution of one molecular proportion of hydrogen chloride.

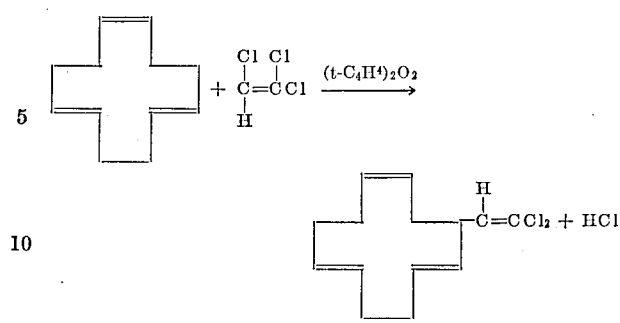

Isomers of the above product may also form in varying amounts depending on the reaction conditions. Such isomers include, for example, bicyclic compounds formed by interaction of two of the double bonds in the ring to yield, for example, a compound containing a 1,2-tetramethylenecyclooctadiene ring system.

Hydrogen chloride is evolved in the condensation reactions herein disclosed in a quantity of one molecular proportion of hydrogen chloride per one molecular proportion of desired product. In cases where it is desirable to avoid radical changes in pH during the course of the reaction, small amounts of the materials which have a buffering effect on the pH may be included in the reaction mixture. For example, an alkaline pH can be maintained by the use of buffers such as borax, disodium phosphate, sodium carbonate, ammonium carbonate, sodium acetate, etc. The presence of water or aqueous solutions of alkali is also often beneficial.

The process of this invention may be carried out in a batch type operation by placing a quantity of the cyclic triene and the free radical generating catalyst in a reactor equipped with a mixing device, adding the polychloroolefin, heating to a preselected reaction temperature while mixing the contents of the reactor, cooling after a suitable period of time, and recovering the condensation products.

The preferred method of operation is the continuous type. In this method of operation the cyclic triene, the polychloroolefin and the catalyst are continuously charged to a reactor maintained at suitable conditions of temperature and pressure. The reactor may be an unpacked vessel or coil, or it may contain an adsorbent packing material such as fire brick, alumina, dehydrated bauxite and the like. The condensation products are separated from the reactor effluent, and the unconverted starting materials may be recycled to the reaction zone. The unreacted materials are lower boiling than the condensation products and thus are readily recoverable by conventional means such as fractionation for purposes of recycle. In the continuous method of carrying out this process, the reactants are added continuously to the reaction zone, but if desired, they may be added intermittently.

In selecting a particular reaction temperature for use in the process of the present invention, two considerations must be taken into account. First, sufficient energy by means of heat must be applied to the reaction system so that the reactants, namely, the selected cyclic triene and polychloroolefin, will be activated sufficiently for condensation to take place when free radicals are generated by the catalyst. Second, free radical generating catalysts such as peroxy compounds, particularly organic peroxides, decompose at a measurable rate with time in a logarithmic function dependient upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. Generally the operating temperature does not exceed the temperature at which the half life is not more than 10 hours by more than about 150° C. since free radical generating catalysts decompose rapidly under such conditions. However, in some instances temperatures as high as 300° C. may be utilized, for example, when a reactor is charged with the desired polychloroolefin and the free radical generating catalyst in solution in the desired cyclic triene is introduced under and by means of pressure as a liquid under the surface of the polychloroolefin maintained at the high temperature. The half life of t-butyl perbenzoate is less than 10 hours at about 110° C., and accordingly when this peroxy compound is used as the catalyst for this process, the operating temperature is from about 110° to about 300° C. but generally not greater than about 265° C. An operating temperature of from about 130° to about 300° C. is used with a di-t-butyl peroxide, and from about 75° to about 300° C. but generally not greater than about 225° C. with benzoyl peroxide. Little advantage is gained if the temperature is too high even though the reactants tend to become more activated in the presence of the free radical generating catalyst decomposing at a high rate since decomposition of the polychloroolefin takes place at temperatures above about 300° C.

Although pressures of up to 100 atmospheres may be utilized, the reaction preferably takes place in liquid phase and thus the pressure will preferably range from about atmospheric to about 100 atmospheres such that a substantial proportion of the reactants is in the liquid phase. Pressure is not an important variable in the process of this invention. However, because of the low boiling points of some of the reactants it is necessary to utilize pressure withstanding equipment to insure liquid phase conditions. In batch type operations it is often desirable to utilize pressure withstanding equipment, to charge the reactants and catalyst to the vessel, and to pressure the vessel with 10, or 30, or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy it is desirable to use low concentrations of catalyst, such as from about 0.1% to about 10% of the total weight of the polychloroolefin and cyclic triene charged to the process. The reaction time may be within the range of less than one minute to several hours, depending upon temperature and half life of the free radical generating catalyst, as set forth hereinabove. Generally, contact time of at least 10 minutes is preferred.

Examples of compounds comprising novel compositions of matter which may be prepared according to the process of this invention include (2-chlorovinyl)cyclododeca-1,5,9-triene,
(2,2-dichlorovinyl)cyclododeca-1,5,9-triene,
(1,2,2-trichlorovinyl)cyclododeca-1,5,9-triene,
(2-bromo-2-chlorovinyl)cyclododeca-1,5,9-triene,
(2-fluoro-2-chlorovinyl)cyclododeca-1,5,9-triene,
(2-chloropropenyl)cyclododeca-1,5,9-triene,
(1,2-dichloropropenyl)cyclododeca-1,5,9-triene,
(2,3-dichloropropenyl)cyclododeca-1,5,9-triene,
(3-bromo-2-chloropropenyl)cyclododeca-1,5,9-triene,
(3-floro-2-chloropropenyl)cyclododeca-1,5,9-triene,
(2,3,3-trichloropropenyl)cyclododeca-1,5,9-triene,
(2,2-dichloro-1-methylvinyl)cyclododeca-1,5,9-triene,
(2-chloro-1-methylpropenyl)cyclododeca-1,5,9-triene,
(2,3-dichloro-1-methylpropenyl)cyclododeca-1,5,9-triene,
Pentachlorocyclopentadienyl cyclododeca-1,5,5-triene, etc.

It is to be understood that the aforementioned compounds are only representatives of the class of compounds which may be prepared and that this present invention is not necessarily limited thereto.

The following examples are given to illustrate the process of the present invention which, however, are not intended to limit the generally broad scope of the present invention in strict accordance therewith.

*Example I*

A mixture of a solution of 60 grams of cyclododecatriene, 51 grams of trichloroethylene, 11 grams of a free radical generating catalyst comprising di-t-butyl peroxide and 100 cc. of water was placed in the glass liner of a rotating autoclave. The autoclave was sealed and nitrogen pressed in until an initial pressure of 30 atmospheres had been reached. The autoclave was heated to a temperature of about 130° C. and maintained in a range of from about 130° to about 140° C. for a period of about 4.5 hours. During this time the maximum pressure rose to 52 atmospheres. At the end of the desired residence time, the autoclave and contents thereof were cooled to room temperature, the final product being 30 atmospheres. The excess pressure was vented and there was recovered 162 grams of product comprising a clear upper layer and dark lower layer. The upper layer was taken up in pentane, washed with water, dried over potassium carbonate and subjected to fractional distillation under reduced pressure. There was obtained about 15 grams of chlorovinylated product comprising (2,2-dichlorovinyl)cyclododeca-1,5,9-triene (and isomers thereof) along with higher boiling material consisting of bis- and tris-dichlorovinylated cyclododecatriene. Of this material a cut which boiled at 111° C. at 1.2 mm. pressure (286° C. at 760 mm. pressure) was analyzed. This cut had a refractive index $n_D^{22.5}$ of 1.5383.

*Analysis.*—Calculated for $C_{12}H_{17}CH=CCl_2$: C, 65.38; H, 7.05; Cl, 27.57. Found: C, 65.72; H, 7.31; Cl, 26.8.

The nuclear magnetic resonance spectrum indicated that the cut was (2,2-dichlorovinyl)cyclododeca-1,5,9-triene mixed with a (2,2-dichlorovinyl)bicyclo(6,4,0) dodecadiene.

*Example II*

A solution of 152 grams of cyclododecatriene, 53 grams of trichloroethylene and 17 grams of di-t-butyl peroxide in a glass liner in a rotating autoclave under 30 atmospheres nitrogen pressure was heated at 130°–140° C. for 4.5 hours during which the pressure rose to 46 atmospheres. The final pressure was 30 atmospheres. The product, a dark liquid weighing 219 grams, was distilled under reduced pressure. There was obtained 21 grams of material boiling chiefly at 133° to 136° C. at 3.3 mm. pressure (293°–296° C. at 760 mm. pressure). It had a refractive index $n_D^{20}$ of 1.5348.

*Analysis.*—Calculated for $C_{12}H_{17}CH=CCl_2$: Cl, 27.57. Found: Cl, 27.7, 27.4.

The nuclear magnetic resonance spectrum indicated that the product was chiefly (2,2-dichlorovinyl)cyclododeca-1,5,9-triene.

Example III

A mixture of a solution of 60 grams of 1,5,9-cyclododecatriene, 38 grams of 1,2-dichloroethylene, 6 grams of t-butyl perbenzoate and 100 cc. of water is placed in the glass liner of a rotating autoclave. The autoclave is sealed and nitrogen pressed in until an initial pressure of approximately 30 atmospheres is reached. The autoclave and contents thereof are then heated to a temperature of about 110° C. and maintained in a range of from about 110° to 115° C. for a period of about 4.5 hours. At the end of this time the autoclave and contents thereof are allowed to cool to room temperature, the excess pressure is vented and the product comprising a clear upper layer and dark lower layer is recovered. The upper layer is taken up in an organic solvent comprising pentane, washed with water, dried under potassium carbonate and subjected to fractional distillation under reduced pressure. The desired product comprising (2-chlorovinyl)cyclododeca-1,5,9-triene is separated and recovered.

Example IV

A mixture of a solution of 60 grams of 1,5,9-cyclododecatriene, 43 grams of 1,2-dichloropropene, 10 grams of benzoyl peroxide and 100 cc. of water is placed in a rotating autoclave which is thereafter sealed. Nitrogen is pressed in until an initial pressure of 30 atmospheres is reached following which the autoclave is heated to a temperature of about 60° C. The autoclave is maintained at a temperature in the range of from about 60° to about 90° C. for a period of about 4.5 hours. At the end of this desired residence time the autoclave and contents thereof are allowed to cool to room temperature, the excess pressure is vented and the product comprising a clear upper layer and dark lower layer is recovered. The upper layer is taken up in pentane, washed with water, dried over potassium carbonate and subjected to fractional distillation under reduced pressure. The desired cut comprising (2-chloropropenyl)cyclododeca-1,5,9-triene and isomers thereof is separated and recovered.

Example V

A solution of 60 grams of 1,5,9-cyclododecatriene, 56 grams of 1,1,2-trichloropropene, 10 grams of di-t-butyl peroxide and 100 cc. of water is placed in the glass liner of a rotating autoclave which is thereafter sealed and heated to a temperature of about 130° C. after having nitrogen pressed in until an initial pressure of 30 atmospheres is reached. The autoclave is maintained at a temperature in the range of from about 130° to 140° C. for a period of about 4.5 hours, following which it and the contents therein are allowed to cool to room temperature. The excess pressure is vented and the upper product layer is taken up in pentane, washed with water, dried over potassium carbonate and subjected to fractional distillation under reduced pressure. The desired product comprising (2,2-dichloroisopropenyl)cyclododeca-1,5,9-triene and isomers is separated and recovered.

Example VI

A solution of 60 grams of cyclododecatriene, 49 grams of 2,3-dichloro-2-butene and 11 grams of di-t-butyl peroxide in 100 cc. of water is placed in the glass liner of a rotating autoclave which is thereafter sealed and subjected to superatmospheric pressures by the introduction of nitrogen gas until a pressure of 30 atmospheres is reached. The autoclave is maintained at a temperature in the range of from about 130° to 140° C. for a period of about 4.5 hours, at the end of which time it is allowed to cool to room temperature. The excess pressure is vented and the upper layer of the product which is recovered upon opening of the autoclave is taken up in pentane, washed with water, dried over potassium carbonate and subjected to fractional distillation under reduced pressure. The desired product comprising (2-chloro-1-methylpropenyl)cyclododeca-1,5,9-triene is separated and recovered.

I claim as my invention:

1. A process which comprises condensing a polyhaloaliphatic monoolefin in which the halogens are selected from the group consisting of chlorine, bromine and fluorine and containing at least one chlorine atom on each of the doubly-bonded carbon atoms with a non-conjugated cyclic triene in the presence of at least a catalytic amount of a free radical generating compound at a temperature at least as high as the decomposition temperature of said compound and a pressure sufficient to maintain a substantial proportion of the reactants in liquid phase, and recovering the desired chlorovinyl substituted non-conjugated cyclic triene.

2. A process which comprises condensing a polyhaloaliphatic monoolefin in which the halogens are selected from the group consisting of chlorine, bromine and fluorine and containing at least one chlorine atom on each of the doubly-bonded carbon atoms with a non-conjugated cyclododecatriene in the presence of at least a catalytic amount of a free radical generating compound at a temperature at least as high as the decomposition temperature of said compound and a pressure sufficient to maintain a substantial proportion of the reactants in liquid phase, and recovering the desired chlorovinyl substituted non-conjugated cyclic triene.

3. A process which comprises condensing a polyhaloaliphatic monoolefin in which the halogens are selected from the group consisting of chlorine, bromine and fluorine and containing at least one chlorine atom on each of the doubly-bonded carbon atoms with a non-conjugated cyclododecatriene in the presence of at least a catalytic amount of benzoyl peroxide at a temperature in the range of from about 60° to about 210° C. and a pressure sufficient to maintain a substantial proportion of the reactants in liquid phase and recovering the desired chlorovinyl substituted non-conjugated cyclododecatriene.

4. A process which comprises condensing a polyhaloaliphatic monoolefin in which the halogens are selected from the group consisting of chlorine, bromine and fluorine and containing at least one chlorine atom on each of the doubly-bonded carbon atoms with a non-conjugated cyclododecatriene in the presence of at least a catalytic amount of t-butyl perbenzoate at a temperature in the range from about 110° to about 260° C. and a pressure sufficient to maintain a substantial proportion of the reactants in liquid phase, and recovering the desired chlorovinyl substituted non-conjugated cyclododecatriene.

5. A process which comprises condensing a polyhaloaliphatic monoolefin in which the halogens are selected from the group consisting of chlorine, bromine and fluorine and containing at least one chlorine atom on each of the doubly-bonded carbon atoms with a non-conjugated cyclododecatriene in the presence of at least a catalytic amount of di-t-butyl peroxide at a temperature in the range of from about 130° to about 280° C. and a pressure sufficient to maintain a substantial proportion of the reactants in liquid phase and recovering the desired chlorovinyl substituted non-conjugated cyclododecatriene.

6. A process which comprises condensing trichloroethylene with 1,5,9-cyclododecatriene in the presence of at least a catalytic amount of di-t-butyl peroxide at a temperature in the range of from about 130° to about 150° C. and a pressure sufficient to maintain a substantial proportion of the reactants in liquid phase, and recovering the desired (2,2-dichlorovinyl)cyclododeca-1,5,9-triene.

7. A process which comprises condensing 1,2-dichloroethylene with cyclododecatriene in the presence of at least a catalytic amount of t-butyl perbenzoate at a temperature in the range of from about 110° to about 125° C. and a pressure sufficient to maintain a substantial proportion of the reactants in liquid phase, and recovering the desired (2-chlorovinyl)cyclododeca-1,5,9-triene.

8. A process which comprises condensing 1,2-dichloropropene with cyclododecatriene in the presence of at least a catalytic amount of benzoyl peroxide at a temperature in the range of from about 60° to about 90° C. and a pressure sufficient to maintain a substantial proportion of the reactants in liquid phase, and recovering the desired (2-chloropropenyl)cyclododeca-1,5,9-triene.

9. A process which comprises condensing 1,1,2-trichloropropene with cyclododecatriene in the presence of at least a catalytic amount of di-t-butyl peroxide at a temperature in the range of from about 130° to about 150° C. and a pressure sufficient to maintain a substantial proportion of the reactants in liquid phase and recovering the desired (2,2-dichloro-1-methylvinyl)cyclododeca-1,5,9-triene.

10. A process which comprises condensing 2,3-dichloro-2-butene with cyclododecatriene in the presence of at least a catalytic amount of di-t-butyl peroxide at a temperature in the range of from about 130° to about 150° C. and a pressure sufficient to maintain a substantial proportion of the reactants in liquid phase and recovering the desired (2-chloro-1-methylpropenyl)cyclododeca-1,5,9-triene.

11. A chlorovinyl substituted non-conjugated cyclododeca triene.

12. (2,2-dichlorovinyl)cyclododeca-1,5,9-triene.

13. (2-chlorovinyl)cyclododeca-1,5,9-triene.

14. (2-chloropropenyl)cyclododeca-1,5,9-triene.

15. (2,2 - dichloro - 1 - methylvinyl)cyclododeca-1,5,9-triene.

16. (2 - chloro - 1 - methylpropenyl)cyclododeca - 1,5,9-triene.

References Cited by the Examiner
UNITED STATES PATENTS
2,481,159   9/1949   Schmerling _____ 260—648

LEON ZITVER, *Primary Examiner.*